Nov. 13, 1956 A. KREIDLER 2,770,311
LIGHT MOTORCYCLE CONVERTIBLE TO ENGINE-ASSISTED
PEDAL CYCLE AND VICE VERSA
Filed June 23, 1954 2 Sheets-Sheet 1

INVENTOR
Alfred Kreidler
By Ernest Montague
Attorney

Nov. 13, 1956 A. KREIDLER 2,770,311
LIGHT MOTORCYCLE CONVERTIBLE TO ENGINE-ASSISTED
PEDAL CYCLE AND VICE VERSA
Filed June 23, 1954 3 Sheets-Sheet 2

INVENTOR
Alfred Kreidler

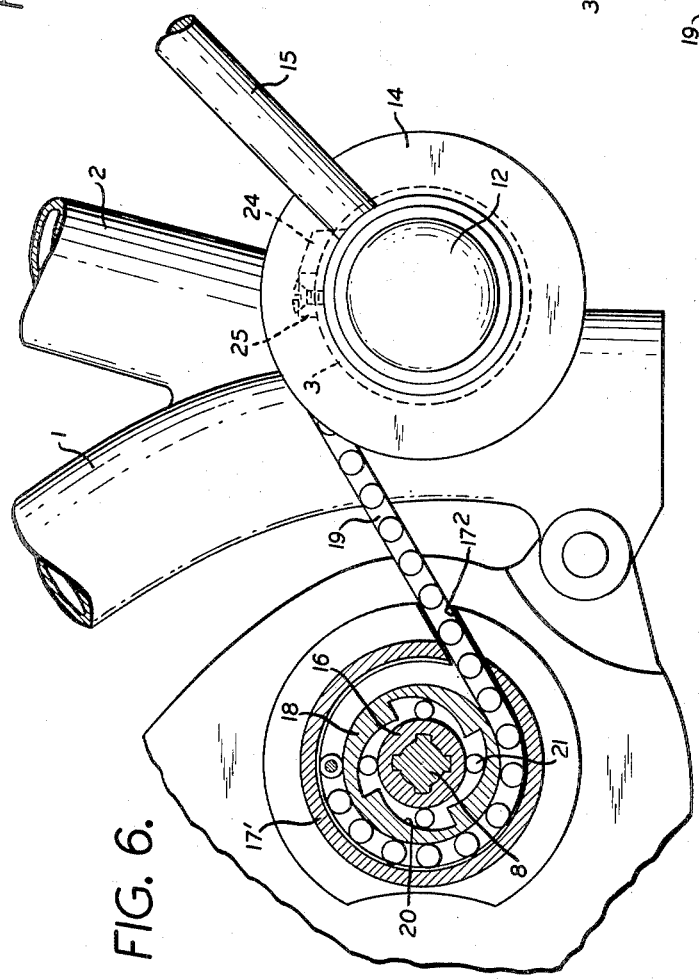

United States Patent Office 2,770,311
Patented Nov. 13, 1956

2,770,311

LIGHT MOTORCYCLE CONVERTIBLE TO ENGINE-ASSISTED PEDAL CYCLE AND VICE VERSA

Alfred Kreidler, Stuttgart, Germany

Application June 23, 1954, Serial No. 438,700

Claims priority, application Germany June 26, 1953

6 Claims. (Cl. 180—33)

The present invention concerns engine-gearbox units for light motorcycle and engine-assisted pedal cycles.

Owing to the efficiency of engines of small piston displacement used today in engine-assisted pedal cycles fitted with a pedal crank, the wish has often been expressed among cyclists to dispense altogether with the pedal crank so that a cycle can be used in the manner of a normal motorcycle.

It is, therefore, one object of the present invention to construct or convert a single-track vehicle by fitting a pedal crank drive or a pair of footrests as an engine-assisted pedal cycle or a light motorcycle, as required.

It is another object of the present invention to provide a vehicle with a gear containing among other elements a starter device, namely a kickstarter, the latter not used in the case of an engine-assisted pedal cycle and, in that event, the actuating member would be removed.

It is still another object of the present invention to provide for a vehicle, which can be so converted, as required, a gear having a connecting member for an attached starter device, preferably for a kickstarter.

With these and other objects in view which will become apparent in the following detailed description, the present invention will be clearly understood in connection with the accompanying drawings, in which:

Fig. 5 is a vertical fragmentary section on the line V of Fig. 4, on an even larger scale;

Fig. 6 is a side view, partly in section, of the kickstarter on a somewhat larger scale; and Fig. 7 is a plan view of the kickstarter.

Figure 1:
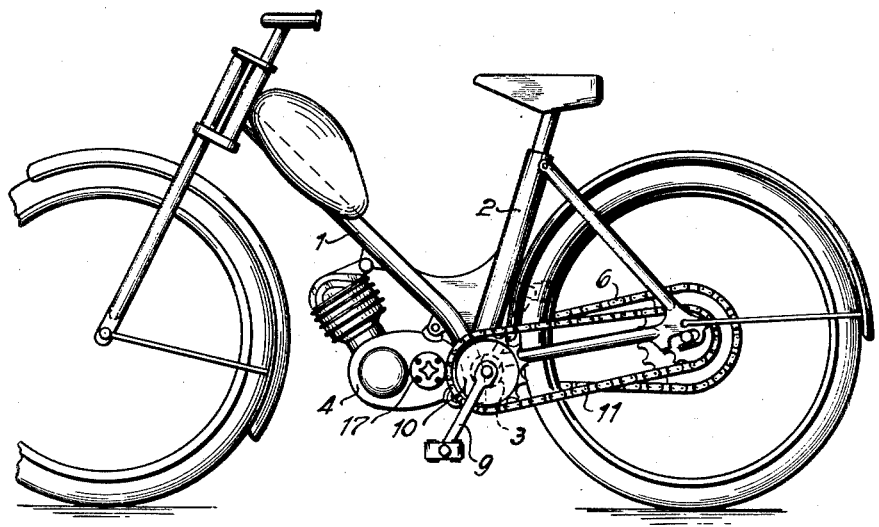
Fig. 1 is a side elevation of such a vehicle constructed as an engine-assisted pedal cycle.

A frame welded together from two tubular sections 1 and 2 has a bearing 3 at the bottom bracket position where these sections are connected together. A unitary engine-gearbox 4, throated at the front, is suspended from the frame. A driving chain wheel 5, mounted on the right, is connected by a chain 6 to the rear wheel. On the left side the gear housing has a pot-shaped depression 7 (see Fig. 5) into which projects a tapered end portion 8 of a gear shaft suitable for starting the engine.

Figure 2:
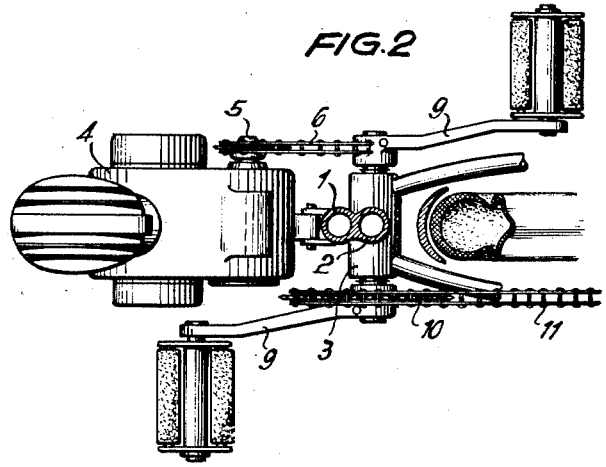
Fig. 2 is a horizontal fragmentary section or plan view, respectively, somewhat above the axis of the pedal crankshaft, of the driving mechanism of the vehicle as shown in Fig. 1 on a somewhat larger scale.
Figure 3:
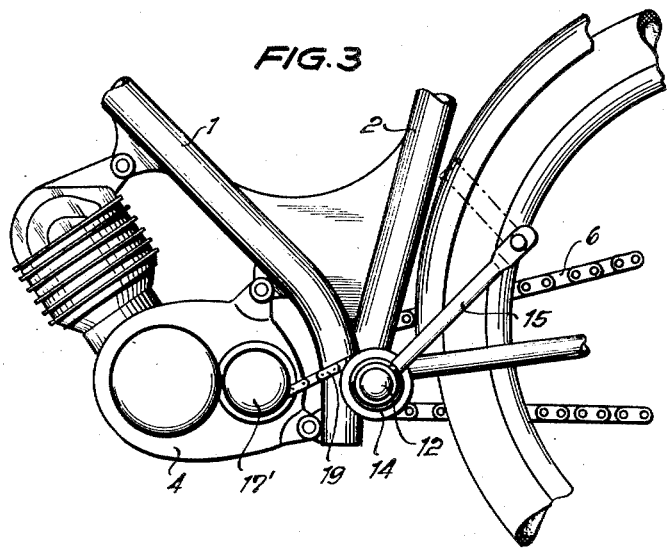
Fig. 3 is a side elevation of the driving mechanism of the vehicle constructed as a light motorcycle, on the same scale as Fig. 2.
Figure 4:
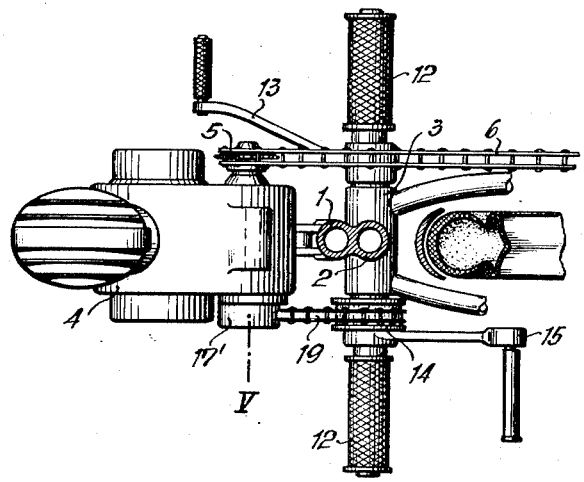
Fig. 4 is a plan view, corresponding to Fig. 2, of the driving mechanism shown in Fig. 3 on the same scale as Fig. 2.

When assembled as an engine-assisted pedal cycle as shown in Figs. 1 and 2, a pedal crank 9 is mounted in the bearing 3 having, on the left-hand side of the vehicle, a chain-wheel 10 acting on the rear wheel through a second driving chain 11. The depression 7 is closed by a cover plate 17.

If it is intended to assemble the same vehicle as a light motorcycle, a footrest bar 12 instead of the pedal crank 9, is inserted into the bearing 3, a foot brake lever 13 being mounted on the right of said footrest bar 12 and a chain shaft, to which a chain roller 14 is secured, on the left thereof. A kickstarter lever 15 is secured to the chain shaft. The kickstarter device includes a sleeve 16 fixed on to the tapered end portion 8 of the gear shaft aforementioned and enclosed by a housing 17' instead of the previous cover plate 17. The kickstarter device includes further a chain roller 18 which is connected with the chain roller 14 by a chain 19. The chain roller 18 is mounted on the sleeve 16 and has at its inner face cam faces 20 which combined with clamping rollers 21 form a freewheel which couples the chain roller 18 with the sleeve 16 in one direction of rotation. The sleeve 16, the chain roller 18 and the clamping rollers 21 are retained in position by a split ring 21' and thus form a single unit which may be attached to the tapered end portion of a shaft 8 in a single step.

The sleeve 16 has at its inner bore axially disposed key grooves which permit the sliding of the sleeve 16 together with the chain roller 18 on to the tapered end portion 8 of a gear shaft. A split ring 22 secures the sleeve 16 against axial movement. A torsion spring 23 disposed between the gear housing and the chain roller 18 functions as resilient return means for the latter relative to the sleeve 16. Upon mounting the sleeve 16 with the chain roller, the depression 7 is closed up by a housing 17' which has a slot 17² through which the chain 19 enters.

The chain roller 14 engages with its nose 24 in its normal position, due to the force exerted by the torsion spring 23, an abutment 25 screwed to the bearing 3, thereby tensioning the chain 19. In order to start the engine the kickstarter lever 15 is pushed down and, thereby, the chain roller 14 turned. The latter transfers the turning movement to the chain roller 18 by means of the chain 19, the chain roller 18 transferring its movement by means of the coupling 20, 21 to the sleeve 16 and to the tapered end portion 8 of the gear shaft, thus starting the engine.

Once the engine runs, the one-way coupling 20, 21 releases the connection between the sleeve 16 and the chain roller 18 and upon release of the kickstarter lever 15, the kickstarter device is returned to its normal original position by means of the torsion spring 23, whereby the nose 24 of the chain roller 14 engages the abutment 25 again.

While a specific structure of a kickstarter device has been shown, it is to be understood that any equivalent kickstarter may be used, since the special kickstarter does not constitute part of the present invention. Thus, the engine may be started as in the case of normal motorcycles, by treading down the kickstarter lever 15. It is obvious that the neutral gear position, must be selected.

The above embodiment shows how an engine-assisted pedal cycle or a light motorcycle may be manufactured in a simple manner from a basic model, or how one vehicle may be subsequently converted into the other vehicle.

While I have disclosed one embodiment of the present invention, it is to be understood that this embodiment is given by example only and not in a limiting sense, the scope of the present invention being determined by the objects and the claims.

I claim:

1. In a light motorcycle convertible into an engine-assisted pedal cycle, a cycle frame carrying a front and a rear wheel, a unitary crankcase and gearbox assembly having a recess in one side thereof, a first shaft rotatable in geared relationship to said engine and having one end portion within said recess and its other end portion carrying a first chain-wheel with first means for driving said rear wheel, a freewheel chain sprocket engaging said one end portion of said first shaft and a kickstarter chain having one end attached to said sprocket, if used as a motorcycle only, said cycle frame having a bottom bearing, a footrest bar mounted in said bottom bearing and a kickstarter lever attached to the other end of said kickstarter chain and mounted for partial rotation coaxially with said footrest bar, said footrest bar and said kickstarter lever being adapted to be replaced by a second shaft carrying pedal cranks and a second chainwheel with second means for driving said rear wheel, in order to convert said motorcycle to an engine-assisted pedal cycle.

2. The motorcycle, as set forth in claim 1, in which said freewheel chain sprocket is removably engaging said one end portion of said shaft.

3. The motorcycle, as set forth in claim 2, in which said kickstarter lever is operatively connected by means of said kickstarter chain with said freewheel chain sprocket.

4. In a light motorcycle convertible into an engine-assisted pedal cycle, a cycle frame carrying a front and a rear wheel, a unitary crankcase and gearbox assembly having a recess in one side thereof, a first shaft rotatable in geared relationship to said engine and having one end portion within said recess and its other end portion carrying a first means for driving said rear wheel, a kickstarter device engaging said one end portion of said first shaft, if used as a motorcycle only, said cycle frame having a bottom bearing, a footrest bar supported by said bottom bearing and a kickstarter lever mounted for partial rotation coaxially with said footrest bar, and means operatively connecting said kickstarter lever with said kickstarter device, said footrest bar and said kickstarter lever being adapted to be replaced by a second shaft carrying pedal cranks and a second means for driving said rear wheel, in order to convert said motorcycle to an engine-assisted pedal cycle.

5. In an engine-assisted pedal cycle convertible into a light motorcycle, a cycle frame carrying a front and a rear wheel, a unitary crankcase and gearbox assembly having a recess in one side thereof, a first shaft rotatable in geared relationship to said engine and having one end portion within said recess and its other end portion carrying a first means for driving said rear wheel, said cycle frame having a bottom bearing, a second shaft carrying pedal cranks supported by said bottom bearing and said second shaft supported by said bottom bearing and said second shaft having a second means for driving said rear wheel, said second shaft carrying pedal cranks and said second means for driving said rear wheel being adapted to be replaced by a footrest bar and a kickstarter lever rotatably mounted on said footrest bar and said one end of said first shaft being adapted to receive a kickstarter device operatively connected with said kickstarter lever, in order to convert said engine-assisted pedal cycle into a light motorcycle.

6. The engine-assisted pedal cycle, as set forth in claim 5, in which said first means for driving said rear wheel comprises a chainwheel.

References Cited in the file of this patent

UNITED STATES PATENTS

| | | |
|---|---|---|
| 899,746 | Levedahl | Sept. 29, 1908 |
| 1,217,300 | Gustafson | Feb. 27, 1917 |
| 2,263,081 | Fulton | Nov. 18, 1941 |
| 2,331,976 | Hare | Oct. 19, 1943 |

FOREIGN PATENTS

| | | |
|---|---|---|
| 170,977 | Great Britain | Nov. 10, 1921 |
| 1,039,241 | France | May 13, 1953 |